United States Patent [19]

Boyhont et al.

[11] 4,094,626
[45] June 13, 1978

[54] APPARATUS FOR PRODUCING CEMENT CLINKER

[75] Inventors: Donald S. Boyhont, Nazareth; Jay Warshawsky, Allentown, both of Pa.

[73] Assignee: Fuller Company, Catasauqua, Pa.

[21] Appl. No.: 744,364

[22] Filed: Nov. 23, 1976

[51] Int. Cl.² ............................................. F27B 15/00
[52] U.S. Cl. ...................................... 432/58; 432/106
[58] Field of Search ....................... 432/14, 15, 106, 58

[56] References Cited

U.S. PATENT DOCUMENTS

| | | | |
|---|---|---|---|
| 3,864,075 | 2/1975 | Christiansen | 432/58 |
| 3,869,248 | 3/1975 | Hirai | 432/58 |
| 3,881,861 | 5/1975 | Ritzmann | 432/14 |
| 3,940,241 | 2/1976 | Houd | 432/106 |
| 3,986,818 | 10/1976 | Deussner et al. | 432/14 |
| 4,014,641 | 3/1977 | Shigeyoshi et al. | 432/106 |

*Primary Examiner*—John J. Camby
*Attorney, Agent, or Firm*—Frank H. Thomson

[57] ABSTRACT

An apparatus for burning cement raw meal to produce cement clinker which includes a pair of parallel suspension preheaters each adapted to receive cement raw meal and hot spent combustion gas for preheating the cement raw meal. Each of the suspension preheaters discharges preheated raw meal into a single calcining furnace. Combustion takes place in the calcining furnace to produce a calcined raw meal. The spent combustion gases from the calcining furnace are supplied in proportional quantities to each of the parallel suspension preheaters. From the calcining furnace, the calcined raw meal is supplied to a rotary kiln for clinkering the calcined raw meal. Hot cement clinker is discharged into a cooler where the clinker is cooled by passing cooling air upwardly therethrough. The cooling air is heated by the hot clinker and the hottest portion is supplied to the rotary kiln and to the calcining furnace to serve as combustion air. The system is particularly designed for use in converting an existing suspension preheater dry process cement plant to an installation employing a flash furnace to thereby increase the capacity of the plant.

11 Claims, 2 Drawing Figures

APPARATUS FOR PRODUCING CEMENT CLINKER

BACKGROUND OF THE INVENTION

This invention relates to apparatus for burning cement raw meal to produce cement clinker and in particular to a combined suspension preheater, flash calciner, rotary kiln, and clinker cooler for producing cement clinker. The apparatus is particularly useful where one desires to initially construct a clinker producing plant of a given capacity and then at some later date expand the capacity of that clinker producing plant without the necessity of adding a complete separate system.

Prior to the present invention it was known to produce cement clinker in a rotary kiln using a grate type cooler wherein cooling air is passed upwardly through a bed of hot clinker to cool the hot clinker and supplying to the kiln as preheated combustion air some of the cooling air which is heated by the hot clinker. It was also known prior to the present invention to use in the dry process for producing cement clinker a gas-solids heat exchanger which uses the exhaust gases from the rotary kiln for preheating the cement raw meal before it is fed to the kiln. One type of gas-solids heat exchanger is a suspension preheater which includes a plurality of serially flow connected cyclone separators which receive cement raw meal at the top thereof and exhaust gas from the kiln at the bottom thereof with generally counter-current flow of the hot gas and raw material through the preheater to thereby preheat the raw feed for the kiln.

The preheater operates by supplying raw meal to a stream of hot gas, entraining the meal in that hot gas, transferring heat from the hot gas to the raw meal, separating the hot gas and raw meal in a cyclone separator, supplying the raw meal to another stream of hot gas for entrainment and subsequent separation. A typical system may include four cyclone separators to achieve four stages of heat exchange.

A more recent development in the art is the employment of a separate calcining furnace or flash furnace for receiving preheated raw material from the preheater, subjecting that material to a temperature on the order of 900° C for a brief period of time, perhaps 1 or 2 seconds, to accomplish about 95% calcination of the raw meal and then supplying this calcined raw meal to the rotary kiln for clinkering. The addition of the flash furnace results in increasing the capacity of a given size kiln by about two times. The reason for this is that the rotary kiln now only performs the clinkering phase of producing cement clinker rather than both the calcining and clinkering phase. A system such as the above is shown, for example, by U.S. Pat. No. 3,869,248.

In many instances, a cement producer will desire to construct a new plant of a given capacity which may suit his current needs as well as his current budget. For example, a cement producer may desire to install a clinker producing plant having a production capacity of 1,000 tons per day. The most modern method of producing cement at 1,000 tons per day may be a dry process cement plant with a suspension preheater. Accordingly the cement producer may install such apparatus. At some future date, the cement producer may require say 2,000 tons per day production. The producer has a choice of installing a completely separate rotary kiln and suspension preheater clinker producing system, or by the present invention, adding a flash furnace and additional suspension preheater system to his existing clinker producing system.

With the use of pre-calcining, an up to two fold increase in capacity can be achieved while using the same size rotary kiln. An additional suspension preheater is required because the existing suspension preheater will not be able to reasonably handle the full capacity of the new system. The material cooler will also have to be expanded in size and the kiln speed increased due to the additional clinker produced.

Various dual preheater systems employing a flash calciner and rotary kiln clinkerer are known prior to the present invention. Such systems are shown in U.S. Pat. Nos. 3,864,075 and 3,881,861 and Japanese Utility Model Application No. S 47-19826, filed Feb. 17, 1972. The use of a two parallel suspension preheaters with two parallel flash furnaces each being supplied raw meal from its associated preheater and both feeding calcined raw meal to the single clinkering kiln is, of course, a possible solution, but such a system would be more costly as two flash furnaces would be required meaning two vessels and associated auxiliary equipment and would not be as thermally efficient as a single flash furnace. The use of a single flash furnace and a dual final cyclone which supplies spent combustion gas to both suspension preheaters heretofor presents the problem of insuring equal gas and material distribution to the two suspension preheaters. A balanced gas distribution can be achieved through the control of the separate preheater fans, but the division of material exiting the flash furnace to dual cyclones is difficult to control. Therefore, a single calcining furnace and single final cyclone is herein proposed.

SUMMARY

It is therefore the principal object of this invention to provide a cement clinker producing system of increased production capacity which is capable of utilizing a maximum amount of an existing suspension preheater and kiln clinker producing system.

It is a further object of this invention to provide a cement clinker producing system which can be manufactured for a reasonable cost compared to the alternatives available.

It is another object of this invention to provide a cement clinker producing system which may be used to expand the production capability of an existing suspension preheater — kiln system and utilize a maximum of components of the existing system.

In general, the foregoing and other objects will be carried out by providing an apparatus for burning cement raw meal to produce cement clinker comprising: a pair of parallel suspension preheaters, each including means for supplying hot gases to the bottom thereof for passage upwardly through the suspension preheater and means for supplying cement raw meal to the top thereof for passage downwardly through the suspension preheater generally countercurrent to the flow of hot gas whereby the cement raw meal is heated by the hot gas, a calcining furnace having an inlet for combustion gas, an inlet for heated cement raw meal, means for producing combustion within the calcining furnace for at least partially calcining the cement raw meal and an outlet for spent combustion gas and the at least partially calcined cement raw meal; separator means flow connected to the outlet of the calcining furnace for separating the at least partially calcined cement raw meal from the spent calcining furnace combustion gas; means for supplying the spent calcining furnace combustion gas to both of said parallel suspension preheaters to thereby provide the means for supplying hot gases to the bottom of each suspension preheater; a cement clinkering furnace having an inlet for at least partially calcined raw material, an outlet for cement clinker, means for supplying combustion gas thereto, means for producing combustion within the cement clinkering furnace and an outlet for spent clinkering furnace combustion gas; means for supplying at least partially calcined cement raw meal from said separator means to the inlet for at least partially calcined cement raw meal of said clinkering furnace; and means for supplying the spent clinkering furnace combustion gas from said clinkering furnace to said calcining furnace.

BRIEF DESCRIPTION OF THE DRAWINGS

The invention will be described in connection with the annexed drawings wherein.

DESCRIPTION OF THE PREFERRED EMBODIMENTS

Figure 2:
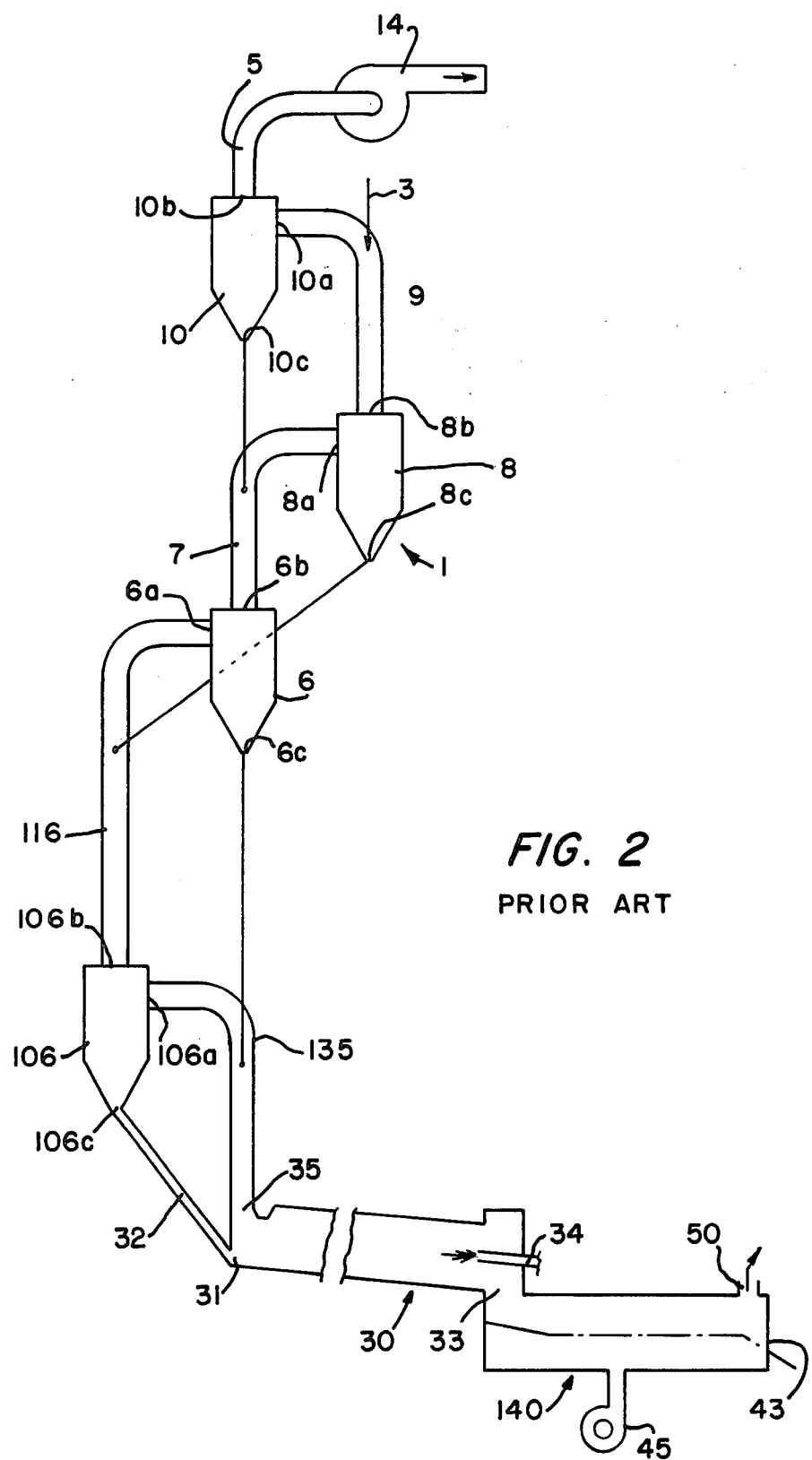
FIG. 2 is a diagrammatic view of a cement clinker producing system according to the prior art.

The present invention may be used to provide a cement clinker producing system either from an existing clinker producing system such as that shown diagrammatically in FIG. 2 or as a new installation. An existing system may consist of merely a kiln and cooler such as might be employed in a long dry kiln system or wet process cement clinker producing system, but is particularly adapted for increasing the capacity capabilities of an existing suspension preheater system such as that shown in FIG. 2. Initially, the apparatus will be described as a unitary system.

Figure 1:
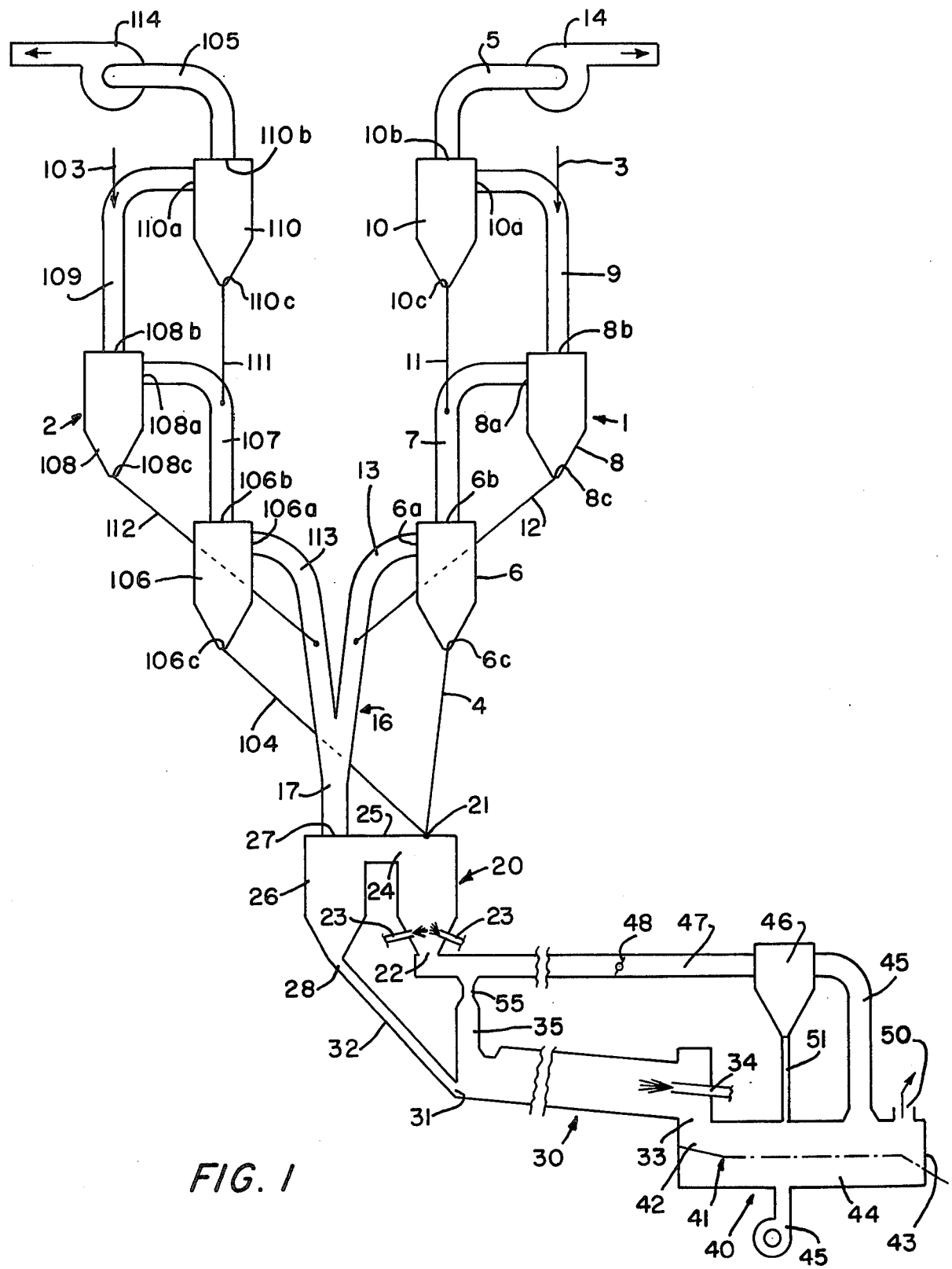
FIG. 1 is a diagrammatic view of the present invention.

Referring to FIG. 1 of the drawing, there is shown a pair of parallel suspension preheaters generally indicated at 1 and 2, a calcining furnace generally indicated at 20, a clinkering furnace generally indicated at 30 and a clinker cooler generally indicated at 40.

Referring to the suspension preheater 1 shown on the right side of the drawing there is provided an inlet 3 for cement raw meal at the top of the preheater and an outlet 4 for preheated cement raw meal at the bottom thereof. There is also provided a plurality of serially flow connected cyclone separators including, in the direction of gas flow, a lowermost cyclone separator 6, an intermediate or next lowermost cyclone separator 8, and an uppermost cyclone separator 10. Each cyclone separator 6, 8 and 10 includes an inlet 6a, 8a and 10a, respectively, for hot gas and suspended raw meal; an outlet 6b, 8b and 10b, respectively, for separated hot gases; and an outlet 6c, 8c and 10c, respectively, for separated raw meal. A first duct 7 interconnects the gas outlet 6b of cyclone 6 with the hot gas and suspended cement raw meal inlet 8a of cyclone 8. A second duct 9 connects gas outlet 8b with gas and suspended cement raw meal inlet 10a of cyclone 10. A third duct 5 extends from gas outlet 10b of cyclone 10 and is flow connected with a means 14 or fan for inducing a draft on the suspension preheater 1. Cement raw meal to be preheated is supplied to second duct 9 at 3, and the outlet 10c is connected to the first duct 7 by a conduit 11.

The suspension preheater 2 is substantially identical to the suspension preheater 1 and includes a plurality of serially connected cyclone separators including in the direction of gas flow a lowermost cyclone 106, an intermediate or next lowermost cyclone 108 and an uppermost cyclone 110. Each of the separators includes an inlet for gas and suspended cement raw meal 106a, 108a and 110a, respectively; an outlet for separated gas 106b, 108b and 110b; and an outlet for separated raw meal 106c, 108c and 110c, respectively. A third duct 105 connects the outlet 110b with a means or fan 114 for inducing a draft on the preheater 2. A first duct 107 connects gas outlet 106b with gas and suspended cement raw meal 108a, and receives raw meal from cyclone 110 through conduit 111. A second duct 109 connects gas outlet 108b and inlet 110a for gas and suspended cement raw meal and receives raw meal through inlet 103.

The system also includes a calcining furnace generally indicated at 20 which includes an inlet 21 for preheated cement raw meal. The calcining furnace 20 also includes an inlet 22 for combustion gas and a burner means 23 for producing combustion within the calcining furnace 20. The burner 23 may be suitably connected to a source of fuel such as coal, oil or gas (not shown). The calcining furnace also includes an outlet 24 for spent calcining furnace combustion gas and calcined raw meal. The outlet 24 is connected through conduit 25 to a means 26 in the form of a cyclone separator for separating at least partially calcined raw meal from the spent calcining furnace combustion gas. The separator 26 includes an outlet 27 for separated spent combustion gas and an outlet 28 for calcined raw meal.

Means 16 or Y shaped duct is provided for supplying spent calcining furnace combustion gas from the gas outlet 27 of separator 26 to both the suspension preheaters 1 and 2. This Y shaped duct 16 includes a leg 17 flow connected to the separator 26 and a pair of branches 13 and 113, each flow connected to the leg 17 and to one of the suspension preheaters 1 and 2. The branch 13 is connected to the inlet 6a of cyclone 6 of preheater 1, and the branch 113 is flow connected to the inlet 106a of cyclone 106 of preheater 2.

The legs 13 and 113 receive cement raw meal from the intermediate cyclone 8 and 108 outlets 8c and 108c through conduits 12 and 112. Preheated raw meal is supplied to the calcining furnace 20 from cyclone outlets 6c and 106c through conduits 4 and 104.

The system includes a cement clinkering furnace 30 in the form of a conventional rotary kiln which includes an inlet 31 for calcined raw meal which is flow connected to the outlet 28 of separator means 26 by means of conduit 32. The kiln 30 includes an outlet 33 for cement clinker, a burner 34 for producing combustion within the kiln 30 and an outlet 35 for spent clinkering furnace combustion gas. The burner 34 is suitably connected to a source of fuel (not shown).

The system also includes a clinker cooler 40 of the well-known reciprocating grate type which includes means 41 for supporting a bed of clinker and advancing the clinker from an inlet 42 for hot clinker to an outlet 43 for cooled cement clinker. Cooling air is supplied to the plenum 44 under the grate 41 by a fan or fans 45 for passage upwardly through the grates 41 and bed of material supported thereon for cooling the hot clinker. As the clinker is cooled, the cooling gas is heated. At least a portion of the heated gas is passed upwardly through the clinker inlet 42 of cooler 40 and clinker outlet 33 of the kiln 30 to serve as secondary air for combustion within the kiln 30. At least a portion of the heated cooling air is passed upwardly through a duct 45, through a cyclone separator 46 and duct 47, having a damper 48 therein, to the inlet 22 for combustion gas of the calcining furnace 20, to thereby provide a means for supplying combustion air to the calcining furnace. The balance of the heated cooling air is discharged to atmosphere through a vent 50. Dust separated in cyclone 46 is returned to cooler 40 by duct 51.

It should be understood that although the system has been shown utilizing a grate type clinker cooler the system could employ another type of cooler such as a rotary cooler or attached tube cooler. The important criteria are to cool the clinker and supply some of the cooling air heated by the hot clinker to the clinkering furnace and some of the heated air to the calcining furnace.

A fixed restriction 55 connects spent clinkering furnace combustion gas outlet 35 with duct 47 and supplies hot exhaust gases from the kiln 30 to the calcining furnace 20.

OPERATION

In operation, the flow of solids in the system is generally countercurrent to the flow of gas. This is particularly true in the preheaters. Starting from the top of the system, with cold cement raw meal and hot gases, the fans 14 and 114 induce a draft or negative pressure in the system. The two fans permit individual control of gas flow rate through each preheater.

Cool raw material is supplied at 3 and 103 to ducts 9 and 109 and is suspended in and entrained by hot gas in duct 9. During the time of suspension and entrainment the raw meal is heated by the hot gas. The hot gas and suspended raw meal are supplied to cyclone separators 10 and 110. Cyclones 10 and 110 separate the raw meal from the hot gas with the gas being discharged through ducts 5 and 105, fans 14 and 114 to atmosphere through a high efficiency filter (not shown). The separated raw meal is discharged from cyclones 10 and 110 through outlets 10c and 110c and ducts 11 and 111 to ducts 7 and 107 where the raw meal is entrained by hot gases discharged from cyclones 6 and 106. The partially heated raw meal is further preheated while in suspension in ducts 7 and 107. The mixture enters cyclones 8 and 108 through inlets 8a and 108a and the separated gas exits from the cyclones through outlets 8b and 108b to entrain material supplied at 3 and 103. The separated raw meal exits the cyclones 8 and 108 through outlets 8c and 108c and falls through conduits 12 and 112 to duct 16 where it is entrained by spent calcining furnace combustion gas and conveyed through branches 13 and 113 to cyclones 6 and 106, respectively. The raw meal is further preheated while in suspension in ducts 13 and 113. Gas separated in cyclones 6 and 106 is discharged through outlets 6b and 106b to entrain raw meal supplied to ducts 7 and 107 by conduits 11 and 111. Preheated raw meal is discharged from cyclones 6 and 106 through outlets 6c and 106c and conduits 4 and 104 to the inlet 21 of flash furnace 20.

In calcining furnace 20, the preheated raw meal is subjected to a combustion zone temperature of approximately 900° C to achieve about 95% calcination of the raw meal. Combustion takes place in furnace 20 with the supply of combustion gas through inlet 22 and burners 23. Calcined cement raw meal and spent calcining furnace combustion gas exit furnace 20 through outlet 24 and duct 25 and enter separator means 26 where spent calcining furnace combustion gas is separated and supplied to the preheaters 1 and 2 by duct 17. Separated at least partially calcined raw meal is discharged through outlet 28 and duct 32 to inlet 31 of the clinkering furnace 30.

Combustion gas and burner 34 produce combustion within kiln 30 and material flows down inclined and rotated kiln 30 toward the hot, discharge end of the kiln. The calcined cement raw meal is heated to clinkering temperatures of 1,000° to 1050° C to produce cement clinker.

Hot clinker is discharged through outlet 33 to cooler inlet 42 where it is advanced through the cooler by grates 42 to outlet 43. Cool gas passes up through the bed of clinker and is heated. At least a portion of the air heated by the clinker is supplied to kiln 30 and at least a portion of the heated air is supplied to calciner 20 by duct 47.

The system of the present invention is designed to provide a means for expanding an existing suspension preheater dry process cement clinker producing plant such as that shown in FIG. 2. Referring to FIG. 2, the parts used in the system of FIG. 1 will be designated by like numerals. The existing system of FIG. 2 consists of a single four suspension preheater such as preheater 1 consisting of four preheat stages formed by cyclones 10, 8, 6 and 106 which preheater feeds a rotary kiln 30 and a cooler 140 similar to, but shorter than cooler 40. In the system of FIG. 2, the outlet 35 for kiln exhaust gases is connected to gas inlet 106a by duct 135 and a duct 116 connects outlet 106b of cyclone 106 to inlet 6a. In order to expand the existing system of FIG. 2, the cyclone 106 will be removed from preheater 1 and be used in conjunction with new cyclones 108 and 110 to form preheater 2 of FIG. 1. A calcining furnace 20 and separator 26 are added along with new Y shaped duct 16. The calciner 20 and separator 26 now forms the fourth stage of both preheaters 1 and 2, and is supplied with preheated raw meal from cyclones 6 and 106. The cooler 140 is increased in length to form cooler 40. Ducts 45 and 47 are also added to the system to supply combustion air to the furnace 20 and a restriction 55 is added to the outlet for kiln gases.

The system of the present invention does not require the use of two flash furnaces, one for each preheater, and permits the division of the hot exhaust gases from the calciner 20 and suspended raw meal from cyclones 6 and 106 into two substantially equal portions with a portion to be sent to the suspension preheater 1 and the other substantially equal portion to be sent to the suspension preheater 2.

With some prior systems it was necessary to supply the exhaust gases from the kiln to one of the suspension preheaters and the exhaust gases from the flash furnace to the other suspension preheater. Such a system is less tolerant of large changes in feed rate. With the present invention, all hot gases may be supplied to both preheaters thereby increasing preheater and overall process efficiency.

The system of the present invention has been described as permitting the doubling of the capacity of an existing installation of the type illustrated in FIG. 1. It should be understood that this is an approximate maximum production increase that can be achieved and this limit is established by the production capabilities of the kiln. It should also be understood that a less than two fold increase in capacity could be achieved. To achieve this, the second preheater 2 of FIG. 1 would have smaller cyclones and ducts than those of preheater 1.

The fan of the second preheater would be of smaller capacity to thereby insure a gas and material flow volumetrically proportional to the size of each of the preheaters. In such an application, if a 50 percent increase in capacity were desired, the preheater 2 would be one half the size of preheater 1 and the gas and material flow to preheater 2 would be one half the flow to preheater 1. In such an application, the cyclone 106 would probably not be used in the preheater 2.

From the foregoing, it should be apparent that the objects of this invention have been carried out. A system has been provided which can expand an existing system with a reasonable cost.

It is intended that the foregoing be merely a description of a preferred embodiment, but that the invention be limited solely by that which is within the scope of the appended claims.

We claim:

1. Apparatus for burning cement raw meal to produce cement clinker comprising:

a pair of parallel suspension preheaters, each including means for supplying hot gases to the bottom thereof for passage upwardly through the suspension preheater and means for supplying cement raw meal to the top thereof for passage downwardly through the suspension preheater generally countercurrent to the flow of hot gas whereby the cement raw meal is heated by the hot gas;

a single calcining furnace having an inlet for combustion gas, an inlet for heated cement raw meal, means for producing combustion within the calcining furnace for at least partially calcining the cement raw meal and an outlet for spent calcining furnace combustion gas and the at least partially calcined cement raw meal;

a single separator flow connected to the outlet of the calcining furnace for separating the at least partially calcined cement raw meal from the spent calcining furnace combustion gas;

means for supplying the separated spent calcining furnace combustion gas from said single separator to both of said parallel suspension preheaters to thereby provide the means for supplying hot gases to the bottom of each suspension preheater;

a cement clinkering furnace having an inlet for at least partially calcined raw material, an outlet for cement clinker, means for supplying combustion gas thereto, means for producing combustion within the cement clinkering furnace and an outlet for spent clinkering furnace combustion gas;

means for supplying at least partially calcined cement raw meal from said single separator to the inlet for at least partially calcined cement raw meal of said clinkering furnace; and means for supplying the spent clinkering furnace combustion gas from said clinkering furnace to said calcining furnace.

2. Apparatus for burning cement raw meal to produce cement clinker according to claim 1 further comprising cooler means having an inlet for receiving hot cement clinker from the outlet of the clinkering furnace and having an outlet for discharging cooled cement clinker, means for passing cooling air upwardly through the hot cement clinker received from the clinkering furnace whereby the cement clinker is cooled and the cooling air is heated, means for supplying at least a portion of the thus heated cooling air to the clinkering furnace to thereby define the means for supplying combustion gas to the clinkering furnace and means for supplying at least a portion of the thus heated cooling air to the inlet for combustion air of the calcining furnace whereby the heated cooling air from the cooler serves as combustion gas for the calcining furnace.

3. Apparatus for burning cement raw meal to thereby produce cement clinker according to claim 2 wherein each of said suspension preheaters includes a plurality of serially connected cyclone separators; each including an inlet for hot gas and suspended cement raw meal, an outlet for separated hot gas and an outlet for separated cement raw meal.

4. Apparatus for burning cement raw meal to thereby produce cement clinker according to claim 3 wherein said means for supplying spent calcining furnace combustion gas to both of said suspension preheaters includes a Y-shaped duct having a leg and a pair of branches with the leg being flow connected to the single separator and each branch flow connected to the leg of the duct and to the inlet for hot gas and suspended cement raw meal of the lowermost cyclone separator of one of the suspension preheaters, and the outlet for separated cement raw meal of the lowermost cyclone separator of both suspension preheaters is flow connected to the inlet for heated cement raw meal of the calcining furnace.

5. Apparatus for burning cement raw meal to thereby produce cement clinker according to claim 4 wherein the outlet for separated cement raw meal of the next lowermost cyclone separator of each of the suspension preheaters is flow connected to one of the branches of the Y-shaped duct which supplies spent calcining combustion gas to each of the suspension preheaters.

6. Apparatus for burning cement raw meal to thereby produce cement clinker according to claim 1 wherein each of said suspension preheaters includes a plurality of serially connected cyclone separators including an uppermost cyclone separator, a lowermost cyclone separator and an intermediate cyclone separator, each having an inlet for hot gas and suspended cement raw meal, and outlet for separated hot gas and an outlet for separated cement raw meal, said means for supplying spent calcining furnace combustion gas including a Y-shaped duct having a leg flow connected to the single separator and a pair of branches, each flow connected to the leg of the duct and to the inlet for hot gas and suspended cement raw meal of the lowermost cyclone separator of one of the suspension preheaters, and the outlet for separated cement raw meal of the lowermost cyclone separator of both suspension preheaters is flow connected to the inlet for heated cement raw meal of the calcining furnace.

7. Apparatus for burning cement raw meal to thereby produce cement clinker according to claim 6 wherein each suspension preheater includes a first duct flow connecting the outlet for separated hot gas of the lowermost cyclone separator with the inlet for hot gas and suspended cement raw meal of the intermediate cyclone separator; a second duct flow connecting the outlet for separated hot gas of the intermediate cyclone separator and the inlet for hot gas and suspended cement raw meal of the uppermost cyclone separator; means for inducing a draft on the suspension preheater; third duct means flow connecting the outlet for separated hot gas of the uppermost cyclone separator with the means for inducing a draft, the means for supplying cement raw meal to the top of the suspension preheaters is adapted to supply cement raw meal to said second duct; the outlet for separated cement raw meal of the uppermost cyclone separator is flow connected to said first duct, the outlet for separated cement raw meal of the intermediate cyclone separator is flow connected to the branch of the Y shaped duct; and the outlet for separated cement raw meal of the lowermost cyclone separator is flow connected to the inlet for heated cement raw meal of the calcining furnace.

8. Apparatus for heat treating solid particulate material comprising:
 a single furnace having an inlet for combustion gas, an inlet for material to be heat treated, at least one fuel burner operatively associated therewith for producing combustion within the furnace, and an outlet for heat treated material and hot spent combustion gas;
 a single separator flow connected to the outlet for heat treated material and hot spent combustion gas of said furnace for separating heat treated material from the hot spent combustion gas;
 a plurality of parallel suspension preheaters;
 means for supplying hot spent combustion gases separated in said single separator to each of said suspension preheaters; and
 means for supplying material to be heat treated to said means for supplying hot spent combustion gas to each of said preheaters whereby the material to be heat treated is suspended in and heated by the hot spent combustion gases and the hot spent combustion gas and material to be heat treated are supplied to each of said suspension preheaters;
 each of said suspension preheaters including means for discharging spent combustion gas from the suspension preheater and means for supplying material to be heat treated which has been preheated by the hot spent combustion gas to the inlet for material to be heat treated of the furnace.

9. Apparatus for heat treating solid particulate material according to claim 8 wherein there are a pair of parallel preheaters and said means for supplying hot spent combustion gases separated in said single separator to each of said suspension preheaters includes a Y shaped duct having a leg flow connected to the single separator and a pair of branches, each flow connecting the leg to one of the suspension preheaters.

10. Apparatus for heat treating solid particulate material according to claim 9 wherein each suspension preheater includes a plurality of serially connected cyclone separators each having an inlet for gas and suspended solid particulate material, an outlet for separated gas and an outlet for separated solid particulate material; the outlet for separated solid particulate material of the lowermost cyclone separator being flow connected to the inlet for material to be heat treated of the furnace to thereby provide the means for supplying material which has been preheated to the inlet for material to be treated of the furnace; the outlet for solid particulate material of the next lowermost cyclone separator being flow connected to one of the branches of the Y-shaped duct to provide the means for supplying material to be heat treated to said means for supplying hot spent combustion gas to each of said preheaters; and the outlet for separated gas of each cyclone separator is flow connected to the inlet for gas and suspended solid particulate material of the adjacent cyclone separator.

11. Apparatus for heat treating solid particulate material comprising:
 a furnace having an inlet for combustion gas, and inlet for material to be heat treated, at least one fuel burner operatively associated therewith for producing combustion within the furnace for heat treating material, and an outlet for heat treated material and hot spent combustion gas;
 a separator having an inlet for heat treated material and hot spent combustion gas flow connected to the outlet for heat treated material and hot spent combustion gas of the furnace, an outlet for heat treated material and an outlet for hot spent combustion gas;
 a plurality of suspension preheaters;
 duct means for supplying hot spent combustion gases separated in said separator to each of said preheaters and including a leg flow connected to the outlet for hot spent combustion gas of said separator and a plurality of branches, each branch flow connected at one end to said leg and at its other end to one of the suspension preheaters;
 means for supplying material to be heat treated to each of the branches of the duct means whereby the material to be heat treated is suspended in and heated by the hot spent combustion gas and the hot spent combustion gas and suspended material to be heat treated are supplied to each of said suspension preheaters;
 each of said suspension preheaters including means for discharging spent combustion gas from the suspension preheater and means for supplying material to be heat treated which has been preheated by the hot spent combustion gas to the inlet for material to be heat treated of the furnace.

* * * * *